May 26, 1964   G. S. MOGILNER   3,134,882
HIGH FREQUENCY DIELECTRIC PREHEATER
Filed Dec. 28, 1962

INVENTOR.
BY George S. Mogilner

United States Patent Office 3,134,882
Patented May 26, 1964

3,134,882
HIGH FREQUENCY DIELECTRIC PREHEATER
George S. Mogilner, 2758 Whittier Blvd.,
Los Angeles 23, Calif.
Filed Dec. 28, 1962, Ser. No. 248,085
2 Claims. (Cl. 219—10.67)

The present invention relates to high frequency dielectric devices and more specifically to such devices utilized for preheating molding plastics.

When various types of plastic molding materials are formed into finished articles by means well known in the art, it occurs that the nearer the material is to its polymerizing stage at the time it is transferred to the molding press, the lower the pressure required to mold the finished article. Lower pressures mean less complex and lighter weight equipment is needed to mold the plastic. Thus operators of plastic molding equipment desire means of preheating the plastic prior to the molding operation. Such means must be quick and accurate, in that the plastic must be preheated to an exact temperature in order to facilitate the molding operation.

For such molding operations, the plastic material is most often supplied in small preformed cylindrical pieces known in the trade as "biscuits." The dimensions of these "biscuits" will vary according to the size of the part to be molded. Thus as the molding job changes, the preheating requirements change. Similarly as the specific composition of the plastic changes so do the pre-heating requirements change.

High-frequency dielectric machines have been found most useful in preheating "biscuits" for molding operations. This is so because dielectric processes will heat a plastic "biscuit" at extremely rapid rates, whereby the biscuits are quickly heated internally as well as externally.

The present invention has as its principal object the provision of a high-frequency preheater having an easily accessible electrode area.

Another object of the invention is to provide a high-frequency preheater in which each successive biscuit is preheated for the exact period of time and at the same power input.

Still another object of the invention is to provide a preheater in which the plastic biscuit is heated for a timed period and the operator is protected from contact with the electrode area.

Further objects and utility of the invention will be made apparent in the following specification when read in conjunction with the accompanying drawing in which.

Figure 1:
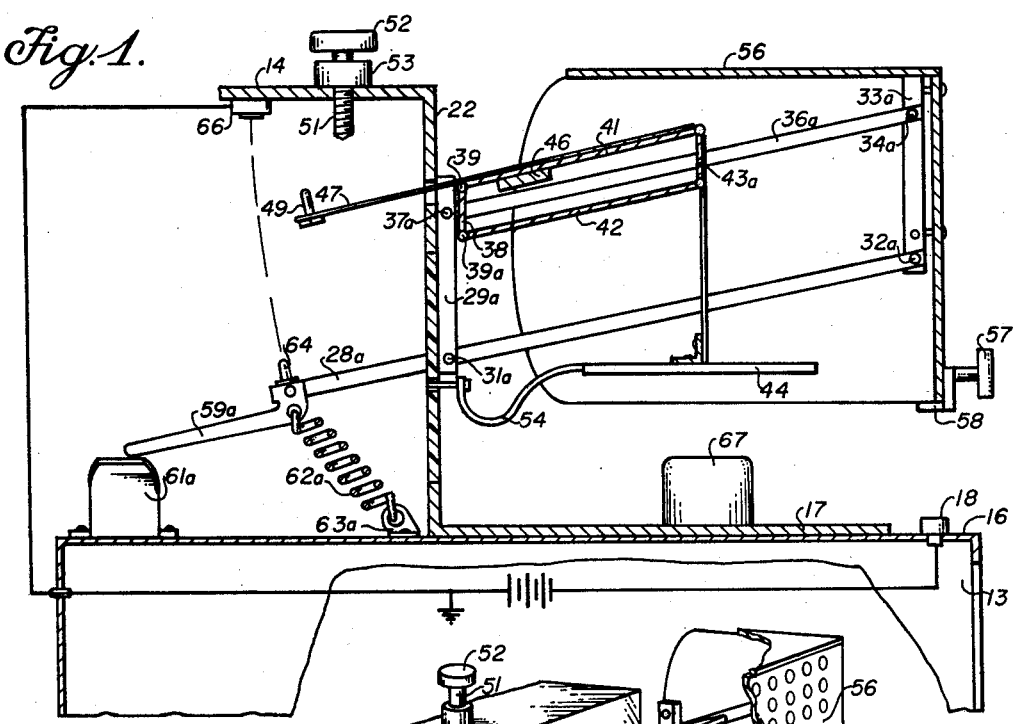
FIGURE 1 is a cross sectional view of the high-frequency preheater.
Figure 2:
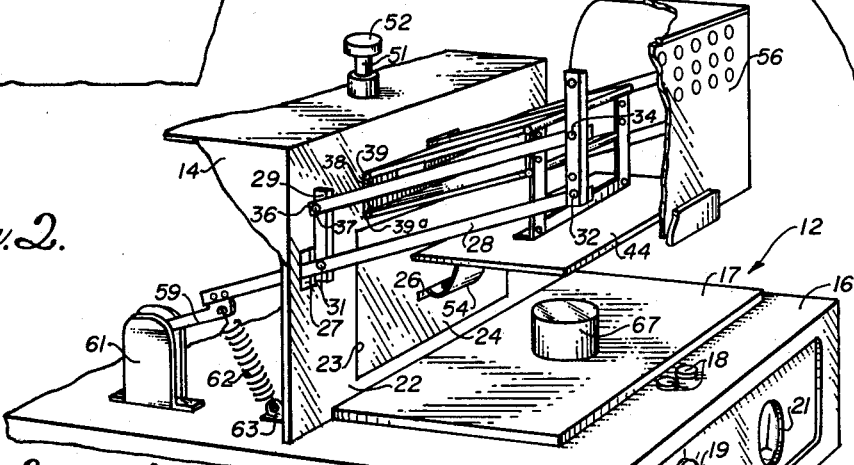
FIGURE 2 is a perspective partially cut-away view of the preheater showing the electrode area with the cage in the raised position.
Figure 3:
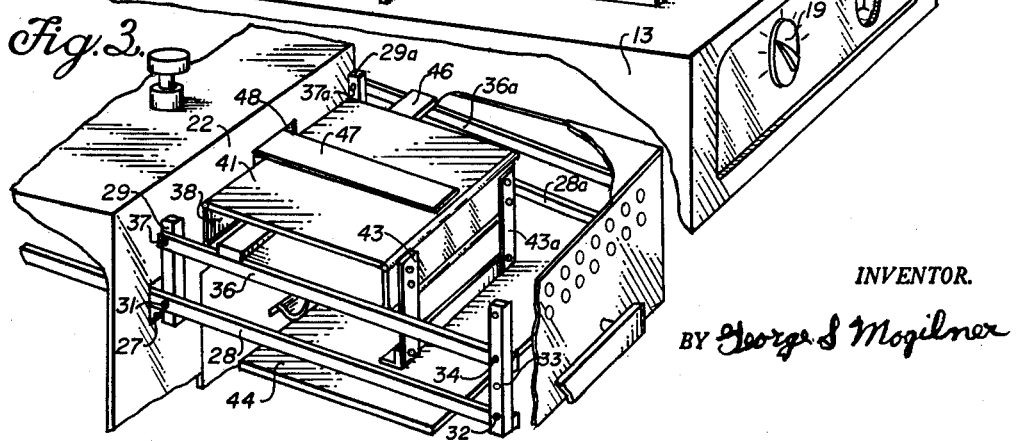
FIGURE 3 is a partial perspective view taken from above the electrode area of the preheater.

With reference to the drawing there is shown in cut-away view the high frequency preheater 12 comprising a lower rectangular box-like body 13 (partly shown) and an integral raised box-like rear portion 14 (partly shown). Body 13 and raised rear section 14 form a complete enclosure for the electronic components of the high frequency circuits (not shown) of the preheater. Such circuitry, however, is conventional and well known to those skilled in the art, and its details are not pertinent herein. Suffice to say the electronic components and circuitry is housed within boxes 13 and 14.

The upper front portion of body 13 forms a flat surface 16 upon which grounded electrode 17 is secured. In addition the upper pole faces 18 of an electro-magnet are secured to the front center portion of surface 16.

The front vertical surface of body 13 has openings for all necessary switches to operate the electrical circuitry. Of interest in the present invention are the openings in which a timer switch 19 and a power meter 21 are affixed. Timer switch 19 is manually rotated to select the time period during which the high-frequency circuit operates. Power meter 21 indicates to the operator the output of the high-frequency circuit, and the means of varying the power output which will become apparent in the description following hereinafter.

The front wall 22 of rear section 14 extends upwardly from the rear of surface 16. A large rectangular port 23 is formed into the midportion of wall 22 and is closed by insulating panel 24 affixed therein. A slot 26 is cut through insulating panel 24 in the central portion thereof.

A pair of apertures 27 (only one shown) are cut through wall 22 at opposite sides thereof about midway up the wall. Lever arms 28 and 28a extend through apertures 27, one lever through each aperture. Pivot supports 29 and 29a are affixed to wall 22 extending from alongside apertures 27 upwardly along wall 22. Lever 28 is pivoted at 31 as it passes by support 29 and through aperture 27, while lever 28a is pivoted at 31a as it passes by support 29a and through the aperture.

Levers 28 and 28a extend outwardly away from wall 22 and terminate at equal distances therefrom at pivots 32 and 32a respectively. The pivots connect the levers with spacers and cage support bars 33 and 33a respectively. Both spacers extend upwardly and terminate somewhat above pivots 34 and 34a. Pivots 34 and 34a are connected to links 36 and 36a respectively, which, in turn extend rearwardly to wall 22 and are connected to pivots 37 and 37a on supports 29 and 29a.

It should be noted that the distance from pivot 31 to 37 (and from 31a to 37a) equals the distance from pivot 32 to 34 (and from 32a to 34a). Also the distance along lever 28 between pivots 31 and 32 (and along lever 28a between pivots 31a and 32a) equals the distance along link 36 between pivots 34 and 37 (and along link 36a between pivots 34a and 37a). Thus lever 28, link 36, spacer 33 and support 29 form a parallelogram which is fixed by support 29, but in which the three remaining parts are free to move in the vertical plane. It should be also noted that while spacer 33 can be moved in the vertical plane, in all positions its axis also remains vertical. The same is true of parts 28a, 36a, 33a and 29a.

A rectangular plate 38 is affixed as by welding to wall 22 above opening 23. Hinges 39 and 39a extend along the upper and lower edges of plate 38 and are parallel to one another and in the horizontal plane. Identically dimensioned rectangular plates 41 and 42 are pivoted along their back edges to hinges 39 and 39a respectively, and extend outwardly from wall 22. Spacers 43 and 43a are hinged to the outer edges of plates 41 and 42. Insulating extensions to spacers 43 and 43a extend below plate 42 and are attached at their lower ends to electrode 44 which is affixed at right angles to the insulating extensions.

It should be noted that plates 38, 41 and 42 and spacers 43 and 43a form a parallelogram similarly to parts 28, 29, 33 and 36 whereby the entire assembly can be moved in the vertical plane, but wherein spacers and extensions 43 and 43a are always vertical and thus electrode 44 is always perfectly horizontal regardless of its distance from electrode 17.

The upper plate 41 of parallelogram 38, 41, 42, 43 and 43a is slightly higher than links 36 and 36a. A bar 46 passes transversely under plate 41 and terminates by weldments at links 36 and 36a. Thus the weight of plate 41 and the parts associated in its parallelogram is constantly downward because of gravity, but its movement downward is necessarily restricted by transverse bar 46 where it crosses under plate 41. If parallelograms 28, 29, 33, 36 and 28a, 29a, 33a, 36a are moved downwards, then parallelogram 38, 41, 42, 43, 43a will move downwards and if moved upwards then the second parallelogram will move upwards. It can be seen that such movements will cause electrode 44 to move closer to or farther away from electrode 17 as the case may be.

An extension 47 is rigidly secured to plate 41 and extends through an aperture 48 in wall 22. Extension 47 extends rearwardly behind wall 22 and terminates in a limiting screw 49.

An adjusting screw 51 and associated adjusting knob 52 passes through a threaded bearing in the upper surface to section 14 at a position vertically above extension 47. A lock nut 53 is provided on screw 51.

A flexible conductor 54 is connected at one end to electrode 44 and at its other passes through slot 26 in insulated plate 24. Conductor 54 is thence connected into the output of the high-frequency circuit (not shown).

A protective cage 56 is attached as by screws or rivets to vertical spacers 33 and 33a. The cage 56 extends across the entire front portion of the parallelogram mechanisms as well as the sides and top thereof. Cage 56 is, however, open at the back adjacent wall 22 and also does not cover the underneath area of the parallelogram mechanisms. A handle 57 is provided on the frontal area of cage 56, close to the bottom thereof. An extension is affixed to handle 57 which extends downwardly to form flanged edge 58. Flange 58 is positioned to bridge electromagnet poles 18 when the cage is lowered to the closed position.

The rearwardly extending portion of levers 28 and 28a terminate in knife edges 59 and 59a, respectively. These knife edges extend rearwardly and are sufficiently long to contact upwardly extending spring-retainer paired leaves 61 and 61a, respectively, which are fastened to the rear upper surface 16 of body 13. Thus when the parallelogram mechanisms and associated cage 56 and electrode 44 are raised to the upper portion of their arcs, knife edges 59 and 59a are forced between spring leaves 61 and 61a, whereby the parallelograms, cage and electrode are retained in the raised position.

Springs 62 and 62a are connected from points adjacent the junction of lever ends 28 and 28a and knife edges 59 and 59a, and terminate in retaining ears 63 and 63a welded to surface 16 just interior of wall 22. Springs 62 and 62a are biased such that they urge the parallelogram levers 28 and 28a downwardly at their interior end. Thus springs 62 and 62a tend to urge electrode 44 and cage 56 upwardly.

Upwardly extending finger 64 is affixed to the interior end of lever 28a, and is positioned such that it actuates a micro-switch 66, affixed to the underside of the upper surface of box 14, when the forward end lever 28a is moved to the lowest point on its downward arc. Microswitch 66 is in turn electrically connected to electromagnets 18 and timer switch 19.

In operation, the operator places a "biscuit" 67 on lower electrode 17 with the cage and associated equipment in the raised position. With the high frequency unit disconnected from its power source, he lowers cage 56 and at the same time manually adjusts screw 51 so that electrode 44 is prevented from touching the biscuit even though cage 56 is lowered to contact magnets 18. It can be seen that as cage 56 is lowered by handle 57, cross bar 46 will also be lowered, thus allowing gravity to pull parallelogram 41, 42, 43 and 43a downwardly as well as connected electrode 44. Eventually however, depending upon its adjustment screw 51 will contact lever 47, thereby preventing electrode 44 from traveling further downward thus by manipulating screw 51, the operator can control the distance between electrodes 44 and 17 and thus make allowances for the thickness of biscuit 67.

In addition screw 51 also permits the operator to control the power feed into biscuit 67 by the high-frequency circuit, since the distance between electrodes 44 and 17 controls the power output.

Limiting screw 49 also prevents electrode 44 from ever coming too close to electrode 17 in the event screw 51 is fully retracted. This acts as a safety precaution.

Having selected the proper setting of screw 51, the operator then connects the preheater to its power source. By handle 57 he lowers the cage assembly until flange 58 contacts electromagnet poles 18, at which time finger 64 also activates microswitch 66. Power is thereby fed into the electromagnets and cage 56 is retained or locked into contact with poles 18.

At the same time power is also fed into the high frequency circuit and from thence into electrode 44, whereby biscuit 67 is heated. Simultaneously the current also activates timer switch 19 which runs for a period previously set by the operator.

When timer switch 19 has run its prescribed period, it automatically cuts off the current to the high frequency circuit and to electromagnet 18. The high frequency circuit therefore shuts off and magnet poles 18 release cage 56. Springs 62 and 62a urge the cage 56 and its associated equipment upwardly. Cross-bar 46 eventually contacts plate 41 and thereby urges it upwardly along with associated parts and electrode 44.

Knife blades 59 and 59a contact spring-retainers 61 and 61a whereby cage 56 and its associated parallelogram and electrode 44 and its associated parallelogram are retained at the upper limits of their arcs.

The operator then is free to reach in with a gloved hand and remove heated biscuit 67 for transfer to the molding machine placed nearby.

It should be noted that by use of the intermeshing parallelogram arrangement, electrode 44 is moved away from the heated biscuit when the cage is opened and the operator has easy access to the area to remove it and then insert a new biscuit.

Depending upon the composition and size of the plastic "biscuit" the operator can adjust the power output of the high-frequency circuit as well as manually adjust timer switch 19 to secure the proper amount of heating of the biscuit.

Hence, once the operator has selected the proper settings of timer switch 19 and screw 51, a continuous succession of identical plastic biscuits can be preheated in the present device and transferred to a nearby molding machine.

What is claimed is:

1. In a preheater for moldable plastics including a high-frequency circuit and an enclosing cabinet the combination comprising an upright wall and a horizontal surface forward of said wall formed into said cabinet, a first grounded electrode affixed to said horizontal surface, a first mechanical parallelogram pivoted on said upright wall and extending forwardly therefrom, at least one lever arm forming part of said parallelogram and extending rearwardly through said wall, said parallelogram adapted for upward and downward movement in relation to said horizontal surface and affixed electrode, a protective cage affixed to the forward portion of said first parallelogram and formed to at least partially cover the volume defined by said wall and horizontal surface, a second mechanical parallelogram affixed at one surface to said wall and extending forwardly from said wall for a distance less than the extension of said first parallelogram, said second parallelogram adapted for upward and downward movement with respect to said horizontal surface, a second horizontally positioned electrode affixed to the forward edge of said second parallelogram, the second electrode insulated from its attached parallelogram and electrically connected to the output of said high-frequency circuit, a cross-member rigidly connected to said first parallelogram and passing through said second parallelogram whereby upward movement of said first parallelogram is imparted to said second parallelogram, an adjustable screw threaded into said cabinet and positioned to limit the downward movement of said second parallelogram, spring means connected to the rearward extension of said lever and biased to force the first parallelogram upwardly, and electrically controlled locking means to hold said cage and the first parallelogram in the downward position against said spring means.

2. The preheater of claim 1 wherein said electrical locking means is activated by a switch responsive to downward movement of said first parallelogram and is deactivated by a timing switch connected to said locking means.

References Cited in the file of this patent
UNITED STATES PATENTS

| | | |
|---|---|---|
| 2,498,632 | Anderson et al. | Feb. 28, 1950 |
| 2,512,751 | Proctor et al. | June 27, 1950 |
| 2,623,982 | Anderson | Dec. 30, 1952 |